United States Patent Office 3,055,870
Patented Sept. 25, 1962

3,055,870
POLYESTERS CONDENSED IN PRESENCE OF PENTAVALENT ANTIMONY COMPOUND AS CATALYST
James Eric McIntyre and Duncan Maclean, Harrogate, England, assignors to Imperial Chemical Industries Limited, London, England, a corporation of Great Britain
No Drawing. Filed Feb. 1, 1960, Ser. No. 5,623
Claims priority, application Great Britain Jan. 26, 1959
15 Claims. (Cl. 260—75)

This invention relates to an improved method for the manufacture of filament and film forming polyesters, more particularly to an improved catalytic system for use in the manufacture of highly polymeric polymethylene terephthalates.

This is a continuation-in-part of our application Serial No. 848,901, filed October 27, 1959, now abandoned.

In the commercial manufacture of highly polymeric polymethylene terephthalates, it is common practice to use as the starting materials a dialkyl terephthalate and a glycol. These two materials are first subjected to an ester-interchange reaction in the presence of an ester-interchange catalyst and the resulting product is then polycondensed without the removal of the ester-interchange catalyst, which may assist also in the polycondensation stage, or in the presence of a substance added to the reaction mixture for the purpose of catalysing the polycondensation reaction.

For the ester-interchange step many catalysts have been disclosed in the prior art. In some cases catalysts which are excellent for the ester-interchange reaction, such as catalytic compounds containing alkaline earth metals, which group of metals includes calcium, magnesium, strontium and barium, if allowed to remain in active form during the polycondensation stage, tend to promote colour formation, particularly as regards yellowness and/or they produce insoluble precipitates in the final polyester, both of which conditions result in undesirable effects in filaments, films and the like produced from these polyesters. A process of this type is disclosed in United States specification 2,739,957, in which a calcium compound is used as the ester-interchange catalyst and an antimony compound in combination with a calcium compound, is used as the polycondensation system. The polyesters obtained using this catalyst system, as exemplified in the specification, are pale green in colour.

In order to overcome this colour formation and/or insoluble precipitate formation it has been proposed, as for example in British patent specification 802,921, to inactivate the catalytic metal used in the ester-interchange reaction, prior to polycondensation stage, by the addition of a phosphorus compound at the end of the ester-interchange reaction. By this means a phosphorus acid salt of the alkaline earth metal present is obtained, which is inert catalytically to the polycondensation reaction and which salt is soluble in the final polyester.

In the process of British specification 802,921 it is stated that it is preferred to use an antimony compound as the polycondensation catalyst, and this has commonly been antimony trioxide. Even using this preferred catalyst system it has been found that the resulting polyesters, although of greatly improved colour over those obtained by prior art methods, still contain a noticeable degree of yellowness.

We have now found that when an alkaline earth metal compound is used as an ester-interchange catalyst and is inactivated prior to the polycondensation stage, and the polycondensation catalyst used is a pentavalent compound of antimony, the resulting polyesters exhibit lower degrees of yellowness together with higher degrees of luminance than do the polyesters obtained using the corresponding trivalent antimony compound, as commonly used in the prior art.

It is an object of the present invention, therefore, to provide a catalyst system for the ester-interchange between a dialkyl terephthalate and a glycol of the series

where $n=2\text{--}10$ inclusive, for example between dimethyl terephthalate and ethylene glycol and for the subsequent polycondensation of the ester-interchange product to provide highly polymeric polymethylene terephthalates capable of being converted into filaments and films.

A further object is to provide a catalyst system for the manufacture of highly polymeric polymethylene terephthalates, which, at the same time, prevents colour formation and/or the production of insoluble precipitates in the final polyesters, which in themselves have increased brightness or sparkle over the polyesters produced by processes using prior art catalyst systems.

It is also an object of the present invention to show that of the alkaline earth metal containing compounds used as ester-innterchange catalysts in the process of our invention, those catalytic compounds containing calcium or magnesium in the formation of polyesters having the lowest degrees of yellowness and at the same time exhibiting the highest degrees of luminance, which factors are commonly held to be criteria of considerable importance in the manufacture of filament and film-forming polyesters.

It has been stated above that our invention employs a polycondensation catalyst in the conversion of the ester-interchange products to polyesters and among such polycondensation catalysts, of the prior art, the preferred substances have been compounds of antimony and in commercial practice this has been the oxide of trivalent antimony, antimony trioxide. However, even when using an ester-interchange catalyst of a previously preferred group, those containing alkaline earth metals, for example calcium acetate, as the ester-interchange catalyst and polycondensing the ester-interchange product in the presence of a catalyst consisting of a catalytically active calcium compound and antimony trioxide, such as as disclosed in United States specification 2,739,957, the resulting polyethylene terephthalate, as exemplified in this specification is pale green in colour.

It is thus an object of our invention to provide a polycondensation catalyst system which is superior to those disclosed in the prior art in that the alkaline earth metal used for ester-interchange purposes which is present in the polycondensation reaction mixture, is present in the form of an alkaline earth metal compound which is catalytically inert to the polycondensation reaction and can therefore neither activate nor cause degradation during the polycondensation stage so that the filament and film-forming polyesters resulting from the process of our invention are substantially colourless.

These and other objects will appear more closely hereinafter. We provide therefore in a process for the manufacture of filament and film-forming highly polymeric polymethylene terephthalates by ester-interchanging a glycol of the series $HO(CH_2)_nOH$, where $n=2\text{--}10$ inclusive, with a dialkyl terephthalate in the presence of a catalytic alkaline earth metal compound and then polycondensing the ester-interchange product, the improvement which comprises converting, prior to polycondensation taking place, at least part of the alkaline earth metal compound present with the ester-interchange reaction product, into a catalytically inert phosphorus acid salt of that metal which is soluble in the polycondensation reaction mixture and then polycondensing in the presence of a catalytic amount of a pentavalent antimony compound and the catalytically inert phosphorus acid salt of the alkaline earth metal.

We have found that of the alkaline earth metal containing compounds used as ester-interchange catalysts in the process of our invention, the catalytic compounds containing magnesium or calcium result in the formation of polyesters exhibiting the lowest degrees of yellowness and at the same time exhibiting the highest degree of luminance. These factors are commonly held to be criteria of considerable importance in the manufacture of filament and film-forming polyesters. However, any catalytic alkaline earth metal compound is suitable in the process of our invention as the ester-interchange catalyst. Whereas we prefer magnesium and calcium containing compounds, other alkaline earth metal compounds such as those containing barium and strontium may be used. We prefer that the catalytic alkaline earth metal compounds should be soluble in the ester-interchange reaction mixture, such as alkaline earth metal salts of aliphatic and aromatic carboxylic acids, particularly those in which the substituents are of a polar nature. Preferred ester-interchange catalysts include magnesium carbonate, magnesium oxide and calcium acetate. If desired an additional ester-interchange catalyst may be used in conjunction with the alkaline earth metal compounds, for example cobalt acetate.

As stated in the process disclosed in British patent specification 802,921, the amount of the phosphorus acid salt formed affects the degree of colour and/or of turbidity of the resultant polyester. For polyesters to be used in the manufacture of filaments, it is normally desirable that the whole of the alkaline earth metal compound present with the ester-interchange product should be converted to an alkaline earth metal salt of a phosphorus acid in order to be catalytically inert in the subsequent polycondensation reaction. However, it has been found that polyesters containing a small amount of insoluble alkaline earth metal compounds can be converted to films having improved friction characteristics, thus by controlling the extent of formation of phosphorus acid salts in the polyester to be converted into film, the frictional properties of the film can be adjusted.

Any phosphorus compound may be added to the polyester forming reactants which permits an alkaline earth metal salt of an acid of phosphorus to be present during the polycondensation reaction. Suitable phosphorus compounds to be added include phosphoric acid, phosphorous acid, alkyl phosphates and phosphites, aryl phosphates and phosphites, ammonium phosphates and phosphites and glycol phosphates and phosphites. Our preferred phosphorus compounds are the trivalent compounds of phosphorus, particularly phosphorous acid and triphenyl phosphite.

As the pentavelent antimony compounds to be used as the polycondensation catalysts in the process of our invention, we prefer to use antimony pentoxide or antimonic acid but other pentavalent antimony compounds such as organic antimonates, for example pentaethyl antimonate or antimony pentaglycoloxide may be used readily. As commercially obtained, some so-called pentavalent antimony compounds often contain small amounts of trivalent antimony compounds, commonly as the trioxide, and in order to obtain the best results the pentavalent antimony compound should contain less than 1%, preferably less than 0.5% by weight of a trivalent antimony compound.

Of the many catalytic combinations which can be used according to the process of our invention we prefer to use a catalytic magnesium or calcium compound, triphenyl phosphite or phosphorous acid and antimonic acid or antimony pentoxide. These preferred catalytic combinations have been found to give polyesters having the highest degrees of luminance consistent with minimum degrees of yellowness.

The ester-interchange catalyst may be added in any amount such that it does not cause undesirable coloration in the final polyesters, but in practice we have found it preferable to add the catalytic alkaline earth metal compound in an amount between 0.01–0.2% by weight based on the weight of dialkyl terephthalate used.

The phosphorus compound added to inactivate the ester-interchange catalyst is added in an amount up to the stoichiometric equivalent of the weight of ester-interchange catalyst according to the degree of inactivation desired. However, if desired, in total a greater than a stoichiometric equivalent may be added, and this excess may be added either at the end of the ester-interchange or during the polycondensation reaction itself.

The pentavalent antimony compound used as polycondensation catalyst can also be added in any suitable amount provided that it does not cause undesirable coloration of the final polyester. We prefer that the polycondensation catalyst be added in an amount between 0.005 and 0.1% by weight based on the original weight of dialkyl terephthalate used. The polycondensation catalyst may be usually added to the ester-interchange reaction mixture if desired, but we have found that it is preferable to add the polycondensation catalyst after inactivation of the ester-interchange catalyst has taken place. This later addition results in the obtaining of polyesters having remarkably high degrees of luminance and low degrees of yellowness. In the case of certain polycondensation catalysts such as antimony pentafluoride, it is essential that they be added after ester-interchange as the presence of the fluoride ion in the reaction mixture inhibits the ester-interchange.

Both the ester-interchange and polycondensation reactions may take place at atmospheric or under sub- or super-atmospheric pressure conditions, in either the liquid or solid phase. We prefer that the ester-interchange takes place under atmospheric pressure conditions at a temperature between 150 and 235° C. and that polycondensation takes place under reduced pressure conditions preferably at a pressure less than 1 mm. of mercury in the temperature range of 210–300° C., desirably below 285° C., preferably in the liquid, i.e. melt phase.

During ester-interchange methanol is continuously withdrawn from the reactor and when methanol ceases to be evolved, the ester-interchange is substantially complete. Reduced pressure is essential during the polycondensation stage for the satisfactory removal of the glycol liberated, to enable the formation of a high molecular weight polyalkylene terephthalate from which filaments and films can be drawn.

The present invention is particularly exemplified hereinafter with respect to the preparation of polyethylene terephthalate from dimethyl terephthalate and ethylene glycol; however it should be understood that the process is fully applicable to the manufacture of filament and film-forming polyesters in which the starting materials may be any low molecular alkyl ester of terephthalic acid or mixture of such esters or these esters may be partially replaced, e.g. up to 40% by weight with esters of other dicarboxylic acids such as of isophthalic, phthalic, adipic, sebacid, glutaric and naphthalic acids. Alternatively glycols other than ethylene glycol, of the series $$HO(CH_2)_nOH$$

where $n=2–10$ inclusive, may be used or mixtures of any of these glycols or with other glycols such as hexhydro-paraxylylene glycol may also be used as starting materials.

The process of our invention while exemplified as a batch process may readily be operated as a continuous process in either or both of the ester-interchange and polycondensation stages. The catalyst of our invention may be added to the reaction mixture when operating continuously either individually, collectively or in the form of a solution or a dispersion, for example in an alcohol and for this we have found the use of the glycol used in the reaction to be a particularly suitable solvent or dispersing agent for the catalysts.

For the purpose of comparing the yellowness and luminance of samples of polyester the reflectance of polymer and in the form of ribbon may be measured on a "Colormaster" which is the trade name for the differential colorimeter manufactured by the Manufacturers Engineering and Equipment Corporation.

Luminance (Y on the C.I.E. system) is a measure of the proportion of the incident light reflected and yellowness is a measure, based on C.I.E. chromaticity co-ordinates, of the separation of the point representing the colour rating of the polymer from the point representing standard illuminant C, positive values being measured in the direction of a dominant wave-length of 580–590 m$\mu$ and negative values in the direction of a dominant wave-length of 470–490 m$\mu$.

Relatively small variations in the luminance and yellowness values of polyesters prepared for filament and film ultimate end uses can be of considerable importance in deciding the value of such polyesters for commercial purposes and it is thus essential, particularly for filament end uses, that such polyesters should have high degrees of luminance together with low degrees of yellowness.

The improved colour of polyesters obtained using the process of the present invention is shown to be particular to the catalytic system used for when the antimony trioxide in the prior art catalyst system, as disclosed in United States patent specification 2,650,213, that is a litharge/triphenyl phosphite/antimony trioxide system, is replaced by a pentavalent antimony compound, for example antimony pentoxide no decrease in yellowness occurs with no useful increase of luminance.

We have found that when the yellowness value is not substantially less than zero and when using a tri- or penta-valent antimony compound as the polycondensation catalyst, a useful criterion of colour is obtained by subtracting the yellowness value from that of the luminance. The best colour is obtained when the luminance value minus the yellowness value is at a maximum. However, for a comparison of this type to be made it is essential that the polyesters in the examples to be compared are manufactured under identical conditions for example on the same scale and in the same equipment. It must be also noted that no direct comparison using this criterion can be made if an additional ester-interchange catalyst is present in the ester-interchange reaction mixture as this catalyst in itself may upset the luminance/yellowness balance.

The following examples, in which all parts are by weight, illustrate but do not limit the scope of our invention.

*Example 1*

Dimethyl terephthalate (100 parts), ethylene glycol (70.5 parts), magnesium carbonate (0.03 part) and antimonic acid (0.05 part) were heated at 170–230° C. until the theoretical amount of methanol for complete ester-interchange had been collected. Phosphorous acid (0.03 part) was added. The excess glycol was distilled off, and the pressure was gradually reduced to 0.5 mm. Polymerisation was continued at a temperature of 280° C. until an intrinsic viscosity of 0.70 had been attained, when the polymer was extruded. The product was colourless.

By comparison with the above, Example 1 was again carried out, but without the addition of phosphorous acid, the product was pale yellow in appearance.

*Example 2*

(a) Dimethyl terephthalate (100 parts), ethylene glycol (68 parts), and magnesium carbonate (0.035 part) were heated together in an agitated stainless steel vessel. Evolution of methanol commenced at a temperature of 175°, and continued for 1 hr. 45 min. until the theoretical yield of methanol (40 parts) had been evolved. The temperature was then 225° C. Glycol (20 parts) was then distilled off, and the residue was transferred into a second stainless steel vessel, also agitated. Phosphorous acid (0.035 part) was added, followed after an interval of 5 minutes by fine slurries of antimony pentoxide (0.045 part) and titanium dioxide (0.5 part) in glycol. The pressure was reduced and the temperature raised until a pressure of 0.2 mm. of mercury and a temperature of 280° had been attained. The desired degree of polymerisation was reached after 2 hr. 20 min. at a pressure below 1 mm., and the polymer was extruded and cast as a ribbon on water-cooled rollers.

The reflectance of the polymer ribbon was measured on a "Colormaster"; the luminance was 77 and the yellowness 11.

(b) Polymer made in the same equipment and under the same conditions, but with the addition of 0.01 part of cobalt carbonate together with the magnesium carbonate, gave a luminance of 65 and a yellowness of −1.

(c) Dimethyl terephthalate (100 parts), ethylene glycol (68 parts), magnesium carbonate (0.035 part), and antimony trioxide (0.04 part) were heated together in an agitated stainless steel vessel. Evolution of methanol commenced at a temperature of 175°, and continued for 1 hr. 55 min. until the theoretical yield of methanol (40 parts) had been evolved. The temperature was then 225° C. Glycol (20 parts) was distilled off, and the residue was transferred into a second stainless steel autoclave, also agitated. Phosphorous acid (0.035 part) was added, followed after 5 minutes by a fine slurry of titanium dioxide (0.5 part) in glycol. The pressure was reduced and the temperature raised until a pressure of 0.3 mm. of mercury and temperature of 280° had been attained. The desired degree of polymerisation was reached after 2 hrs. at a pressure below 1 mm., and the polymer was extruded and cast as a ribbon on water-cooled rollers.

The ribbon had a luminance of 56 and a yellowness of 4. The luminance using antimony pentoxide was therefore 21 units better than with the trioxide, and the yellowness only 7 units higher.

*Example 3*

Polyethylene terephthalate was made according to the method described in Example 2, but instead of antimony pentoxide, antimony pentachloride (0.09 part) was added, and the titanium dioxide added as a delustrant was omitted. The resulting polymer was clear, bright and colourless.

The corresponding polymer made using antimony trioxide (0.04 part) was greenish-grey in appearance, owing to separation of a small amount of antimony during the course of the polycondensation. A similar pale green colour was obtained using antimony trioxide or potassium antimonyl tartrate as polycondensation catalyst in U.S. Patent No. 2,739,957.

*Example 4*

Polyethylene terephthalate was made according to the method described in Example 2 but instead of antimony pentoxide, pentaethyl antimonate (0.095 part) was added, and the titanium dioxide added as a delustrant was omitted. The polymerisation was normal, and the resulting polymer was clear, bright and colourless.

*Example 5*

Polyethylene terephthalate was made according to the method described in Example 2, but instead of antimony pentoxide antimonic acid (0.052 part) was added. The resulting polymer ribbon had a luminance of 63 and a yellowness of 2. The luminance was therefore 7 units better, and the yellowness 2 units better than from the polymer made using antimony trioxide in Example 2(b).

*Example 6*

Polyethylene terephthalate was made according to the method described in Example 2 but using only 0.023 part of magnesium carbonate as ester interchange catalyst and adding 0.08 part of magnesium antimonate instead of the antimony pentoxide. The polymerisation was normal, and the resulting polymer ribbon had a luminance of 65 and a yellowness of 3. The luminance was therefore 9 units and the yellowness 1 unit better than from the polymer made using antimony trioxide in Example 2(c).

*Example 7*

Polyethylene terephthalate was made according to the method of Example 2(a), but with the addition of calcium acetate (0.07 part) instead of the magnesium carbonate. Methanol evolution commenced at 150° C., and continued for 1 hr. 45 min. until the theoretical yield of methanol had been evolved. Glycol removal and polycondensation were carried out as in Example 2(a), and the resulting polymer ribbon had a luminance of 73 and a yellowness of 5.

Polymer made according to Example 2(c) but with calcium acetate (0.07 part) instead of magnesium carbonate, had a luminance of 52 and a yellowness of 8. The luminance was therefore 21 units better and the yellowness 3 units better using antimony pentoxide than using antimony trioxide.

*Example 8*

Polyethylene terephthalate was made according to the method described in Example 2 except that the catalysts used were:

| | Parts |
|---|---|
| Basic magnesium carbonate | 0.035 |
| Antimonic acid | 0.05 |
| Triphenyl phosphite | 0.13 |

The magnesium carbonate was added before ester interchange, and the antimonic acid and triphenyl phosphite after ester interchange but before polymerisation.

The resulting polymer had a luminance of 68 and a yellowness of 1.

*Example 9*

(a) Polyethylene terephthalate was made according to the method described in Example 8, except that the ester interchange stage was carried out in a glass vessel and the polymerisation temperature was 285° instead of 280°. polymer of luminance 68 and yellowness 1 was obtained.

(b) Example 9(a) was repeated, but using calcium acetate (0.06 part) as ester interchange catalyst instead of magnesium carbonate. Polymer of luminance 71 and yellowness 3 was obtained.

(c) Example 9(a) was repeated, but using manganese acetate (0.02 part) as ester interchange catalyst instead of magnesium carbonate. Polymer of luminance 63 and yellowness −1 was obtained.

(d) Example 9(a) was repeated, but using cobalt acetate (0.02 part) as ester interchange catalyst instead of magnesium carbonate. Polymer of luminance 58 and yellowness −17 was obtained.

(e) Example 9(a) was repeated, but using zinc acetate (0.015 part) as ester interchange catalyst instead of magnesium carbonate. Polymer of luminance 68 and yellowness 6 was obtained.

*Example 10*

Polyethylene terephthalate was made in the equipment used for Example 8, but using as catalysts litharge (0.02 part), antimony trioxide (0.05 part), and triphenyl phosphite (0.1 part), as described in Example I of U.S. Patent No. 2,650,213 except that 0.5 part of titanium dioxide, as delustrant were also added. Ester interchange took 4 hr. 46 min., and polymerisation to the required intrinsic viscosity of 0.675 took 4 hr. 12 min. These times were longer than those required for Example 9(a), whose ester interchange took 3 hr. 39 min. and polymerisation took 2 hr. 44 min. to the same intrinsic viscosity of 0.675.

The polymer ribbon had a luminance of 68 and a yellowness of 7, respectively equal to and 6 units worse than the polymer prepared in Example 9a. By comparison, when the antimony trioxide was replaced by the pentoxide no decrease in yellowness occurred, the product having an intrinsic viscosity 0.646 and a luminance of 73 with a yellowness of 9.

*Example 11*

Example 8 was repeated without the addition of triphenyl phosphite. Polymer of luminance 72 and yellowness 15 was obtained. The polymerisation time was 205 min., compared with 260 min., for the experiment described in Example 8. The omission of the triphenyl phosphite thus improved the polymerisation time but resulted in a deterioration in colour.

*Example 12*

Example 8 was repeated, but using a solution of ethylene glycol phosphite (equivalent to 0.035 part of phosphorous acid) in glycol (2 parts) instead of triphenyl phosphite. Polymer of luminance 70 and yellowness 3 was obtained. The use of an alkyl phosphite instead of an aryl phosphite thus had little effect on the colour of the polymer.

*Example 13*

Example 8 was repeated using phosphorous acid (0.035 part) instead of triphenyl phosphite. Polymer of luminance 71 and yellowness 6 was obtained. The softening point of the polymer, measured by a penetrometer method on a crystallised sample, was 259.7°, compared with a softening point of 263.4° for the polymer prepared in Example 8.

Usually a pure polyethylene terephthalate is desired, and then it is preferable to use triphenyl phosphite, since a lower softening point indicates the presence of a small proportion of diethylene glycol units in the chain; on the other hand, the presence of these diethylene glycol units enhances the dye uptake of the resulting fibres, and this product may be useful where higher dye uptake is desired.

*Example 14*

Pentaethyl antimonate was dissolved in ethylene glycol by warming. On standing in the absence of atmospheric moisture for a few hours the solution deposited colourless crystals which were centrifuged off, washed with dry methanol, and dried. Infra-red spectroscopic examination showed that the crystals were not pentaethyl antimonate but an ester formed with ethylene glycol, containing hydroxyethyl and probably also ethylenedioxy groups; chemical examination showed that the antimony was still in the pentavalent state. The product was therefore antimony pentalglycoloxide.

Polyethylene terephthalate was made according to the method described in Example 2, but instead of antimony pentoxide, antimony pentaglycoloxide (0.1 part) was added and the titanium dioxide was omitted. The resulting polymer was clear, bright and colourless.

The intrinsic viscosity of the polyesters obtained in the examples enabled them to be readily converted to filaments and films having desirable properties, particularly as regards their absence of yellowness and their possession of high degrees of luminance.

Examples 15–19 were all undertaken on similar equipment to and under the conditions used in Example 2. However in each case the percentage weight of ingredients used, based on the weight of dimethyl terephthalate, were

| | Percent |
|---|---|
| Magnesium carbonate | 0.035 |
| Antimonic acid | 0.05 |
| Triphenyl phosphite | 0.13 |
| Titanium dioxide | 0.5 |

In each example the ester-interchange catalyst, magnesium carbonate, was added at the commencement of ester-interchange. The following table shews the points and order of addition of antimonic acid, triphenyl phosphite and titanium dioxide, together with the analytical data for the polymers obtained. Vacuum was applied when the batch temperature was 235° C. and full vacuum was reached when the temperature had risen to 260–270° C. The final batch temperature was 280° C.

The progress of the polycondensation reaction was determined by measuring the power required to turn the agitator in the polyester melt. This was recorded in kilowatts at a constant voltage, the difference between the reading at the beginning of the polycondensation reaction and that at any particular point in the reaction being termed ΔP.

In Example 17, in which half the triphenyl phosphite charge was added at 210° C. and half at 280° C. and in Examples 18 and 19 in which the whole of the triphenyl phosphite was added at 280° C., the addition at 280° C. was always made when 80% of the required rise in ΔP had taken place.

In Examples 17 and 18, the triphenyl phosphite was emulsified with 10 ml. glycol before addition at 280° C. Glycolysis caused a fall in ΔP.

In Example 19 the triphenyl phosphite was added alone at 280° C. A very much smaller fall in ΔP was observed.

The above Examples 15–19 having been undertaken under similar operating conditions may therefore be compared with each other.

Example 15, when compared with Example 16, shews that there is substantially no difference in polyester colour and other resultant properties, whether the polycondensation is added immediately before or after the phosphorus compound addition. We prefer to add the polycondensation catalyst, for example antimonic acid, before the phosphorus compound for example triphenyl phosphite, in order to assist the solubilisation of the polycondensation catalyst before polycondensation commences. This preferred order of addition shews its advantage by a decreased polycondensation time.

Example 17, in which some of the phosphorus compound is added before polycondensation commences, shews that a polyester is obtained having improved colour over the polyesters obtained in Examples 18 and 19, where the phosphorus compound was added after a considerable degree of polycondensation had taken place.

What we claim is:

1. In a process for the manufacture of filament and film-forming polyethylene terephthalate by ester-interchanging ethylene glycol with dimethyl terephthalate in the presence of 0.01–0.2% by weight, based on the weight of dimethyl terephthalate, of an ester-interchange catalyst selected from the group consisting of calcium and magnesium compounds at a temperature from 150–235° C. and then polycondensing the ester-interchange product, the improvement which consists essentially in adding to the ester-interchange product a trivalent phosphorus compound in an amount up to the stoichiometric equivalent of the weight of the ester-interchange catalyst and then polycondensing in the presence of 0.005–0.1% by weight, based on the weight of dimethyl terephthalate, of a catalytic pentavalent antimony compound at a temperature of 210–300° C.

2. In a process for the manufacture of filament and film-forming polyethylene terephthalate by ester-interchanging ethylene glycol with dimethyl terephthalate in the presence of 0.01–0.2% by weight, based on the weight of dimethyl terephthalate, of an ester-interchange catalyst selected from the group consisting of calcium and magnesium compounds at a temperature from 150–235° C. and then polycondensing the ester-interchange product, the improvement which consists essentially in adding to the ester-interchange product a trivalent phosphorus compound in an amount up to the stoichiometric equivalent of the weight of the ester-interchange catalyst and then polycondensing in the presence of 0.005–0.1% by weight, based on the weight of dimethyl terephthalate, of a catalytic pentavalent antimony compound selected from the class consisting of antimony pentoxide, antimonic acid, pentaethyl antimonate and antimony pentaglycoloxide.

3. A process according to claim 1, wherein the ester-interchange catalyst is calcium acetate.

4. A process according to claim 1, wherein the ester-interchange catalyst is magnesium carbonate.

5. A process according to claim 4 wherein in addition to the magnesium carbonate, a catalytic amount of cobalt carbonate is also present.

6. A process according to claim 1 wherein the trivalent phosphorus compound is triphenyl phosphite.

| Ex. No. | Point of addition of— | | | Polycondensation time (from application of full vacuum to stopping agitation) | Intrinsic viscosity | Softening point, °C. | Colour | | |
|---|---|---|---|---|---|---|---|---|---|
| | Antimonic acid | Triphenyl phosphite | Titanium dioxide | | | | Luminance value | Yellowness value | L−Y |
| 15 | At 210° C. to ester-interchange vessel. | At 210° C. to ester-interchange vessel 5 minutes after antimonic acid. | At 210° C. to ester-interchange vessel 5 minutes after the triphenyl phosphite. | 2 hours 47 mins | 0.687 | 263.3 | 70 | 3 | 67 |
| 16 | At 210° C. to ester-interchange vessel, 5 minutes after the triphenyl phosphite. | At 210° C. to ester-interchange vessel. | At 210° C. to ester-interchange vessel, 5 minutes after the antimonic acid. | 2 hours 26 mins | 0.676 | 263.5 | 70 | 3 | 67 |
| 17 | At 210° C. to ester-interchange vessel. | Half charge at 210° C. to ester-interchange vessel 5 minutes after antimonic acid. Second half added at 280° C. to poly-condensation autoclave, 2 hours after full vacuum was reached. | At 210° C. to ester-interchange vessel, 5 minutes after the triphenyl phosphite. | 3 hours 30 mins | 0.654 | 263.1 | 53 | −9 | 62 |
| 18 | do | At 280° C. to polycondensation autoclave, 1¼ hours after full vacuum was reached. | At 210° C. to ester-interchange, 5 mins. after the antimonic acid. | 3 hours 5 mins | 0.688 | 260.7 | 46 | −12 | 58 |
| 19 | do | At 280° C. to poly-autoclave, 1 hour after full vacuum was reached. | do | 1 hour 8 mins | 0.684 | 260.3 | 58 | 5 | 53 |

7. A process according to claim 1 wherein the trivalent phosphorus compound is phosphorous acid.

8. A process according to claim 1, wherein in addition to the amount of trivalent phosphorus compound added to inactivate the ester-interchange catalyst, an additional amount of a phosphorus compound is also added.

9. A process according to claim 2 wherein the pentavalent antimony compound is antimonic acid.

10. A process according to claim 2 wherein the pentavalent antimony compound is antimony pentoxide.

11. A process according to claim 2 wherein the pentavalent antimony compound is an organic antimonate.

12. A process according to claim 11 wherein the pentavalent antimony compound is pentaethyl antimonate.

13. A process according to claim 11 wherein the pentavalent antimony compound is antimony pentaglycoloxide.

14. A process according to claim 1 wherein the pentavalent antimony compound contains less than 1% by weight of an antimony compound in the trivalent state.

15. A process according to claim 1 wherein the pentavalent antimony compound is added to the reaction mixture after inactivation of the ester-interchange catalyst.

References Cited in the file of this patent

UNITED STATES PATENTS

| | | |
|---|---|---|
| 2,739,957 | Billica | Mar. 27, 1956 |
| 2,921,051 | Amborski | Jan. 12, 1960 |

FOREIGN PATENTS

| | | |
|---|---|---|
| 769,220 | Great Britain | Mar. 6, 1957 |
| 802,921 | Great Britain | Oct. 15, 1958 |